United States Patent [19]
Takahashi et al.

[11] Patent Number: 5,104,685
[45] Date of Patent: Apr. 14, 1992

[54] METHOD OF PRODUCING MAGNETIC RECORDING MEDIUM

[75] Inventors: Kiyoshi Takahashi, Ibaraki; Mikio Murai, Hirakata; Masaru Odagiri, Kawanishi, all of Japan

[73] Assignee: Matsushita Electric Industrial Co., Ltd., Osaka, Japan

[21] Appl. No.: 762,080

[22] Filed: Sep. 19, 1991

Related U.S. Application Data

[63] Continuation of Ser. No. 498,437, Mar. 26, 1990, abandoned.

[30] Foreign Application Priority Data

Apr. 6, 1989 [JP] Japan .................................. 1-87615

[51] Int. Cl.⁵ .......................... B44C 1/10; B05D 5/12; H01F 10/02
[52] U.S. Cl. ........................................ 427/39; 427/38; 427/55; 427/131; 427/132; 427/255.7; 427/294
[58] Field of Search ..................... 427/38, 39, 55, 131, 427/132, 249, 294, 255.7

[56] References Cited

U.S. PATENT DOCUMENTS 4,900,622  2/1990  Nakayama et al. ................. 427/131

Primary Examiner—Bernard Pianalto
Attorney, Agent, or Firm—Stevens, Davis, Miller & Mosher

[57] ABSTRACT

A method of producing a magnetic recording medium has the steps of forming a ferromagnetic metallic film layer on a non-magnetic substrate, forming, by a plasma CVD process, a protective layer on the ferromagnetic metallic film layer, and forming an oxidation layer on the protective layer by a process conducted in a vacuum atmosphere. An apparatus is disclosed for carrying out this method has a plasma CVD system for forming a ferromagnetic metallic film layer on a non-magnetic substrate, a feeding device including a plurality of rollers and for feeding the substrate carrying the ferromagnetic metal film layer in a predetermined direction, a processing device disposed at a position corresponding to one of the rollers and capable of forming a protective layer on the ferromagnetic metallic film layer, and a vacuum processing device capable of forming an oxidation layer and disposed downstream of the plasma CVD system as viewed in the direction of feed of the substrate effected by the feeding device.

3 Claims, 5 Drawing Sheets

FIG. I

METHOD OF PRODUCING MAGNETIC RECORDING MEDIUM

This application is a continuation of application Ser. No. 07/498,437, filed Mar. 26, 1990, now abandoned.

BACKGROUND OF THE INVENTION

1. Field Of The Invention

The present invention related to a ferromagnetic metal-film-type recording medium and, more particularly, to a method of producing a magnetic recording medium of the type mentioned above, wherein durability of a protective layer and a top coating layer, which are formed after the formation of a magnetic layer to improve performance of practical use, is remarkably improved, as well as to an apparatus suitable for use in carrying out the method.

2. Description Of The Related Art

Ferromagnetic metal-film-type magnetic recording mediums have been known which are produced by forming, through vacuum evaporation, sputtering, ion plating or the like method conducted in a vacuum atmosphere, a film of Co, Ni, Fe or an alloy including one of those metals as the main components on a polymeric film such as a polyimide film or on a substrate which is made of a non-magnetic metal. These ferromagnetic metal-film-type magnetic recording mediums exhibit remarkably improved recording density as compared with conventional application-type magnetic recording medium.

In order to attain a high recording density, it is an important factor to diminish as much as possible any recording/reproduction defect, as well as to minimize spacing loss due to spacing between the magnetic recording medium and a magnetic head. Magnetic recording also is required to have high durability. In order to meet these requirements, hitherto, it has been known to cover a magnetic layer with a protective layer and, further, to form a lubrication layer as a top-coat layer.

FIG. 6 shows, in section, a known magnetic recording medium which has a protective film formed by a plasma CVD method (Chemical Vapor Deposition) and a lubrication layer formed by a wet-application method. Numeral 1 denotes a substrate, 2 denotes a ferromagnetic metal-film layer formed by vacuum film formation, 3 denotes a back coating layer, 4 denotes a protective layer formed by plasma CVD method, and 5 denotes a lubrication layer formed by wet-application method.

Examples of known method and apparatus for producing the known magnetic recording medium shown in FIG. 6 will be described with specific reference to FIGS. 6 and 7.

A description will be given first of a known apparatus for forming the protective layer 4 by a conventional plasma CVD method will be explained with specific reference to FIG. 7. A magnetic recording medium in the state before the formation of the protective layer 4, denoted by 10a, is wound on a supply roller 11. Numerals 12 and 14 denote pas rollers which rotate in contact with the ferromagnetic film layer 2 on the magnetic recording medium 10. Numeral 13 denotes a main roller which is insulated from the main part of the apparatus and which is capable of feeding the magnetic recording medium 10 in close contact with the ferromagnetic metallic film layer 2 with a predetermined voltage applied therebetween. Numeral 15 designates a take-up roller which continuously takes up the magnetic recording medium 10b after formation of the protective layer 4. Numeral 16 denotes a plasma generating nozzle, 17 denotes an electrode, 18 denotes a gas-introduction port, and 19 denotes a power supply for generating a plasma. These components 16 to 19 in cooperation provide a processing unit for forming the protective layer. Numeral 40 denotes a biasing power supply which applies a voltage between the main roller 13 and the ferromagnetic metal film layer 2 of the magnetic recording medium 10. The bias power supply 40 is disposed outside the vacuum container together with the plasma power supply 19.

A description will now be given of the method for producing the magnetic recording medium employing a known plasma CVD method.

The magnetic recording medium 10a in the state before the formation of the protective layer 4 is unwound from the supply roller 11 and is advanced through the pass roller 12. The magnetic recording medium 10a is further fed in close contact with the main roller 13 with a voltage applied between itself and the main roller 13. On the other hand, a plasma ion current for forming a protective layer is generated as a result of supply of a reaction gas from the gas introduction port 18 and the plasma power supply 19. The ion current is applied through the plasma nozzle 16 so as to reach the ferromagnetic metallic film layer 2 on the magnetic recording medium 10a thereby forming a protective layer 4. The magnetic recording medium 10b with the protective layer 4 formed thereon is taken up by the take-up roller 15 through the pass roller 14. The magnetic recording medium carrying the protective layer 4 formed thereby the above method is temporarily demounted from the plasma CVD apparatus, for the purpose of forming a lubrication layer thereon.

The magnetic recording medium produced by the above-described known method, however, exhibits a small bonding force between the protective layer 4 and the lubrication layer 5, so that the lubrication layer 5 tends to be scraped off by, for example, the magnetic head of a video tape recorder during reproduction. In consequence, since the lubrication layer 5 does not serve as lubricant, fluctuation in the reproduction output is caused due to insufficient lubrication causing troubles such as clogging in the head. Thus, the magnetic recording medium produced by the conventional method has a significant defect.

SUMMARY OF THE INVENTION

Accordingly, an object of the present invention is to provide a method of producing a magnetic recording medium in which, when a lubrication is formed subsequently to formation of a protective layer on the magnetic recording medium, a treatment is conducted to enhance the strength of bonding between the protective layer and the lubrication layer, thereby to obviate problems of the prior art such as scraping of the lubrication layer such as that caused by a head during reproduction on a recording/reproduction apparatus such as a video tape recorder, thus remarkably suppressing fluctuation in the output level, clogging of the head, and so forth.

Another object of the present invention is to provide a apparatus which is suitable for carrying out the method of the invention.

To this end, according to one aspect of the present invention, there is provided a method of producing a magnetic recording medium comprising: preparing a magnetic recording medium by forming a ferromagnetic metallic film layer on a non-magnetic medium; causing the magnetic recording medium to run in a predetermined direction, forming, by a plasma CVD process, a protective layer on the ferromagnetic metallic film layer, and continuously forming, immediately after the formation of the protective layer, an oxidation layer on the protective layer by a process conducted in vacuum atmosphere.

According to another aspect of the invention, there is provided an apparatus for producing a magnetic recording medium comprising: a feeding device having a plurality of rollers capable of feeding, in a predetermined direction, a magnetic recording medium having a non-magnetic substrate and a ferromagnetic metallic film layer formed on the substrate; a plasma CVD device for forming a protective layer on the ferromagnetic metallic film layer; and a device disposed downstream of the plasma CVD device and capable of continuously forming an oxidation layer on the protective layer immediately after the formation of the protective layer.

According to the present invention, a protective layer is formed by a plasma CVD process on the magnetic recording medium and, immediately after the formation of the protective layer, an oxidation film is formed on the protective layer by a treatment which is conducted in a vacuum atmosphere. Any matter depositing to the protective layer generated during formation of the protective layer is removed during cleaning which is conducted in the beginning period of treatment for forming the oxidation film. The oxidation film thus formed improves the strength of chemical bonding between the protective layer and the lubrication layer formed thereon. It is therefore possible to obtain a strong lubrication layer which is resistant to tendency of scraping by heads, thus diminishing fluctuation in the output and clogging in the heads.

The above and other objects, features and advantages of the present invention will become clear from the following description of the preferred embodiments when the same is read in conjunction with the accompanying drawings.

DETAILED DESCRIPTION OF THE PREFERRED EMBODIMENTS

Figure 1:
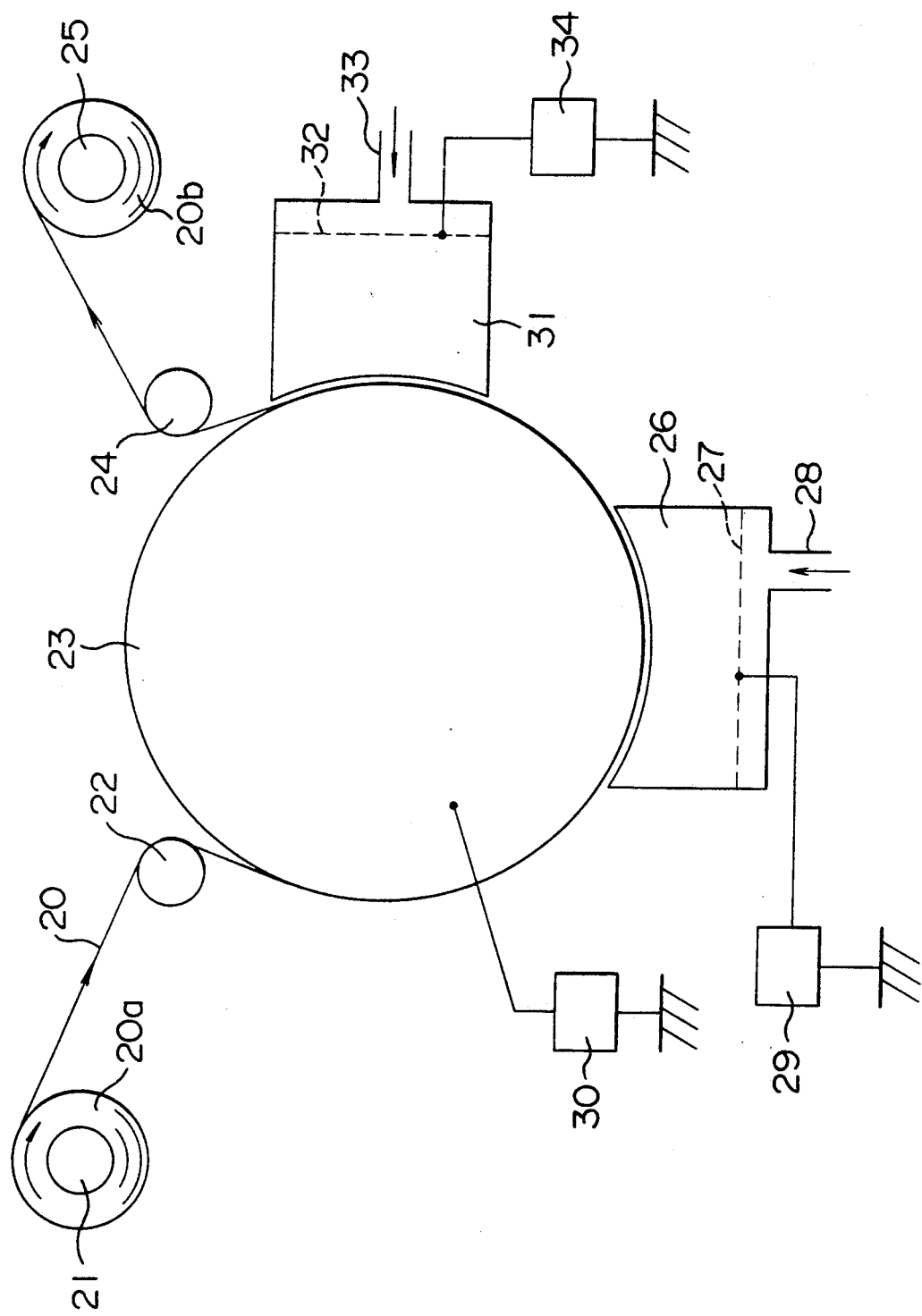
FIG. 1 is a schematic illustration of a first embodiment of the production apparatus in accordance with the present invention in which an oxidation layer is formed on the protective layer by plasma discharge method.
Figure 3:
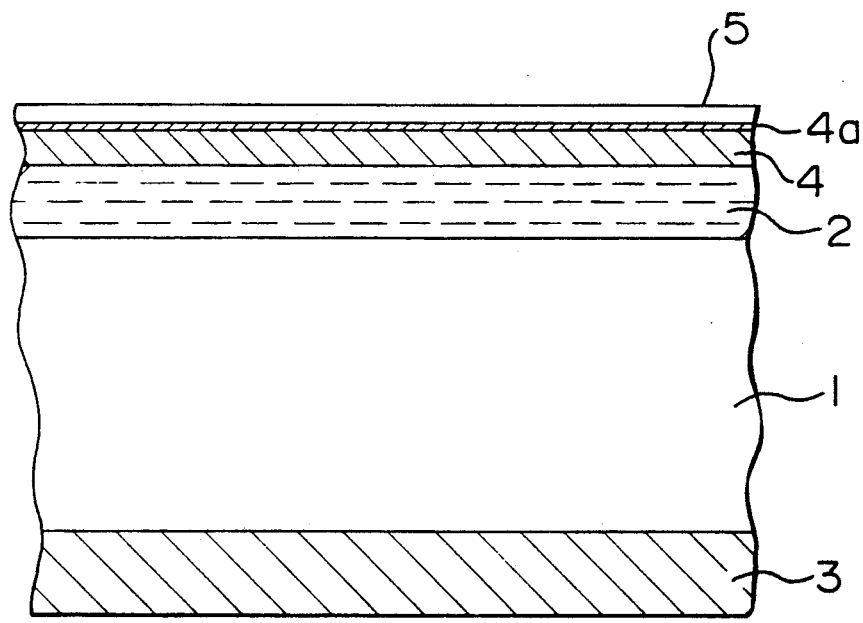
FIG. 3 is an illustration of the construction of a magnetic recording medium produced by the method of the present invention.

FIG. 1 is a schematic illustration of a first embodiment of the production apparatus in accordance with the present invention. FIG. 3 shows the basic structure of a magnetic recording medium 20 to be produced by the method and apparatus of the present invention. The magnetic recording medium 20 has a substrate 1 made of a PET film of 3 to 20 μm thick. The magnetic recording medium 20 also has a ferromagnetic metallic film layer 2 of a Co-Ni alloy having a thickness of 0.1 to 0.2 μm and formed on the obverse side of the substrate 1 by oblique evaporation deposition, and a back coating layer 3 of a mixture of a resin and carbon formed on the back surface of the substrate in order to improve the running characteristics. The magnetic recording medium 20 further has a protective layer 4 formed on the ferromagnetic metallic film layer 2 and a lubrication layer 5 formed on the protective layer 4 through the intermediary of an oxidation film 4a.

Referring to FIG. 1, numeral 20a designates the magnetic recording medium in the state before the formation of the protective layer 4 and the oxidation layer 4a. The magnetic recording medium 20a is wound on a supply roller 21 and is supplied from the roller 21 with a tension supplied of 0.5 to 20 kgf per 500 mm in terms of breadth. Numerals 22 and 24 denote pass rollers which rotate in close contact with the magnetic recording medium 20. Numeral 23 denotes a main roller which is provided on the surface thereof with a dielectric film. A bias power supply 30 imparts a DC bias voltage of $-0.05$ to $-3$KV to the main roller 23. The main roller 23 is driven under such a control as to feed the magnetic recording medium 20 at a constant speed of 0.1 to 200 m/min. Numeral 25 designates a roller which continuously takes up the magnetic recording medium in the state after formation of the protective layer 4 and the oxidation layer 4a. The magnetic recording layer in this state is denoted by 20b. The take-up of the magnetic recording medium 20b by the take-up roller 25 is conducted such that a tension of 0.5 to 20 kgf per 500 mm in terms of breadth is developed. It is also possible to conduct a control of tapered tension. Numeral 26 denotes a plasma nozzle for forming the protective layer 4, while 27 designates a plasma-generating power supply which is connected to a plasma-generating power supply 29. The plasma-generating power supply 29 can apply a voltage of 0.05 to 7 kV in terms of effective value, in the form of a DC, AC or RF voltage or a voltage formed by superposing two or more of these different types of voltage. Numeral 28 designates a gas introduction port through which a gas such as $H_2$, Ar, CH-type reactive gas, or a gaseous phase of ketone, alcohol or the like is introduced at a partial pressure of 0.5 to 0.001 Torr. A bias power supply 30 is capable of applying a DC voltage of $-0.05$ to 3 kV. Numeral 31 denotes a nozzle for forming an oxidation layer 4a, while 32 designates a plasma-generating electrode which is connected to the plasma-generating power supply 34. Numeral 33 denotes a gas introduction port through which an oxidative gas for forming the oxidation layer 4a, such as $O_2$, air, $CO_2$, a gas containing CH and O, or the like is introduced at a partial pressure of 0.3 to 0.001 Torr.

The method and apparatus of producing the magnetic recording medium in accordance with the present invention will be described with reference to FIG. 1.

The magnetic recording medium 20a in the state before the formation of the protective layer and the oxidation layer is supplied from the supply roller 21 and continuously fed towards the take-up roller 25 while being contacted at its side opposite to the ferromagnetic metallic film layer 2 by the main roller 23 to which a predetermined bias voltage is applied by the bias power supply 30. On the other hand, a plasma ion current for forming the protective layer is generated as a result of the supply of the reactive gas through the gas introduction port 28 and application of the voltage by the plasma-generating power supply 29. The ion current reaches the portion of the ferromagnetic metallic film layer 2 on the magnetic recording medium 20a opposing the plasma nozzle 26, whereby the protective layer 4 is formed on the ferromagnetic metallic film layer 2.

During the formation of the protective layer 4, certain matters are caused to deposit to the surface of the protective layer 4 due to presence of activated nuclides or ions which have leaked through the nozzle. The magnetic recording medium 20 now having the protective layer 4 thereon is fed to a subsequent zone for forming the oxidation layer. On the other hand, an ion current of plasma for forming the oxidation film is generated as a result of introduction of a gas through the gas introduction port and application of a voltage from the oxidation-layer-forming plasma power supply 34, so as to reach the surface of the protective layer 4 thereby to form the oxidation layer 4a. Any matter depositing to the surface of the protective layer 4 is removed by the cleaning effect produced by a sputtering phenomenon in the beginning period of the process for forming the oxidation layer 4a.

It is thus possible to form the oxidation layer 4a in such a state that amount of matters depositing to the surface of the protective layer 4 is very small, thus making it possible to effect a very strong chemical bonding between the protective layer 4 and the lubrication layer 5 which is to be formed subsequently. At the same time, clogging in the head, which is one of the defects incurred by the magnetic recording medium 20 during recording and reproduction, can remarkably be decreased.

Figure 2:
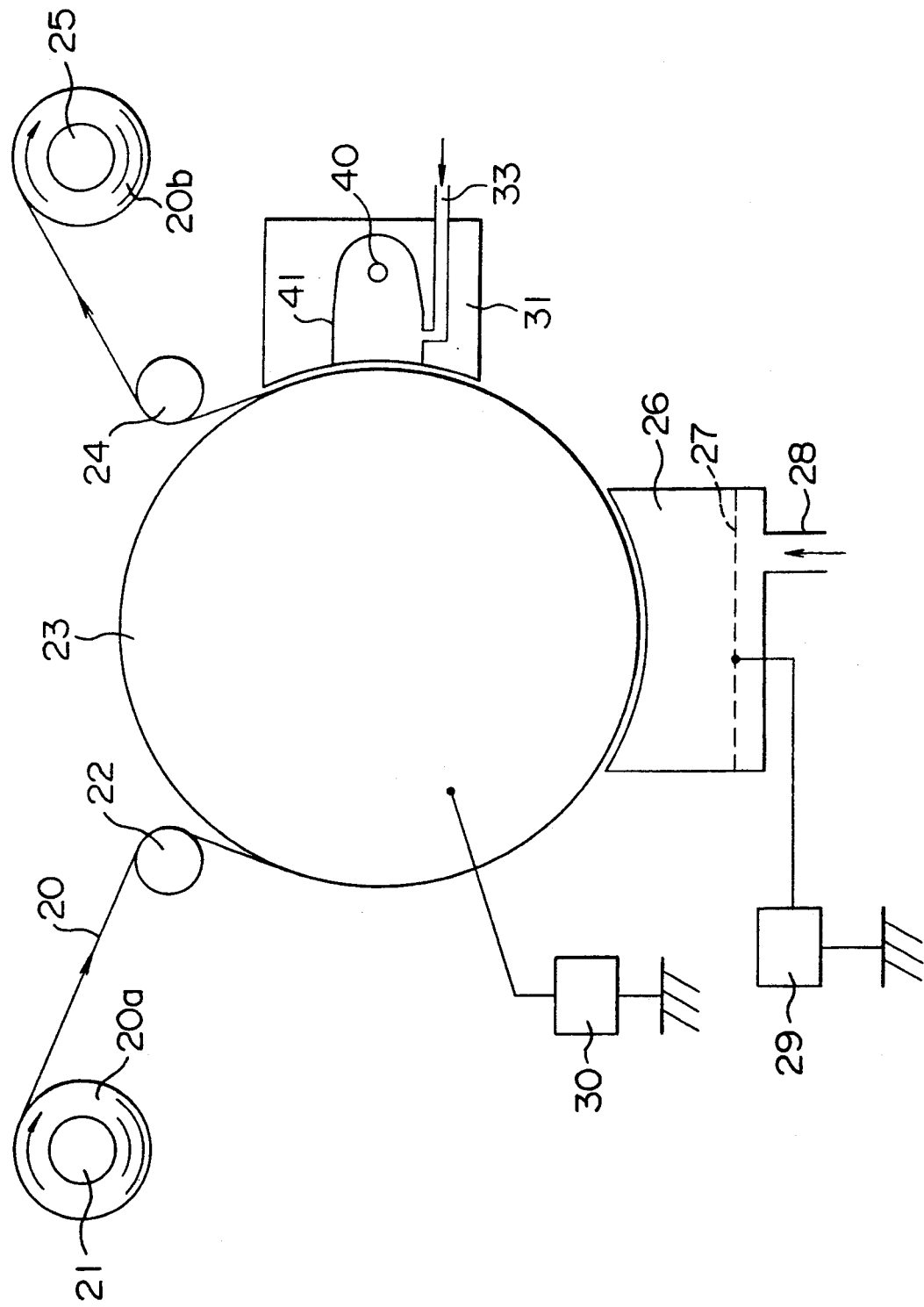
FIG. 2 is a schematic illustration of a second embodiment of the production apparatus in accordance with the present invention which employs a heat source such as a halogen lamp.

A description will not be given of a second embodiment of the present invention in which the processing in vacuum for forming the oxide layer 4a employs a heat source such as a halogen lamp, with specific reference to FIG. 2.

The second embodiment is distinguished from the first embodiment in that, in order to form the oxidation layer by application of heat, the plasma-generating electrode employed in the first embodiment is substituted by a heat source 40 such as a halogen lamp, infrared heater or the like and a reflective plate 41 for converging the heat produced by the heat source. Other portions are materially the same as those in the first embodiment. Thus, the same reference numerals are used to denote the same or corresponding portions and detailed description of such portions is omitted to avoid duplication of explanation.

The second embodiment of the production method of the present invention, as well as the operation of the production apparatus, will be described hereinunder.

The magnetic recording medium 20a in the state before the formation of the protective layer and the oxidation layer is supplied from the supply roller 21 and is fed in close contact with the main roller 23. When the magnetic recording medium 20a has reached a position where it opposes the protective-layer forming nozzles 26 and 27, the plasma ion current is generated as in the case of the first embodiment and reaches the ferromagnetic metal film layer 2 so as to form the protective layer 4 thereon. The magnetic recording medium 20 now carrying the protective layer 4 formed thereon is fed to the subsequent zone for forming the oxidation layer. On the other and, the gas for forming the oxidation layer is introduced towards the protective layer from the same side as the reflective plate for converging heat produced by the heat source which is, for example, a halogen lamp, so that a stable oxidation layer is formed by virtue of the heat. This method offers, in particular, a remarkable improvement in the still durability of the oxidation layer.

Advantages brought about by the embodiments will be described with reference to FIGS. 4 and 5 and also to Table 1.

Figure 4:
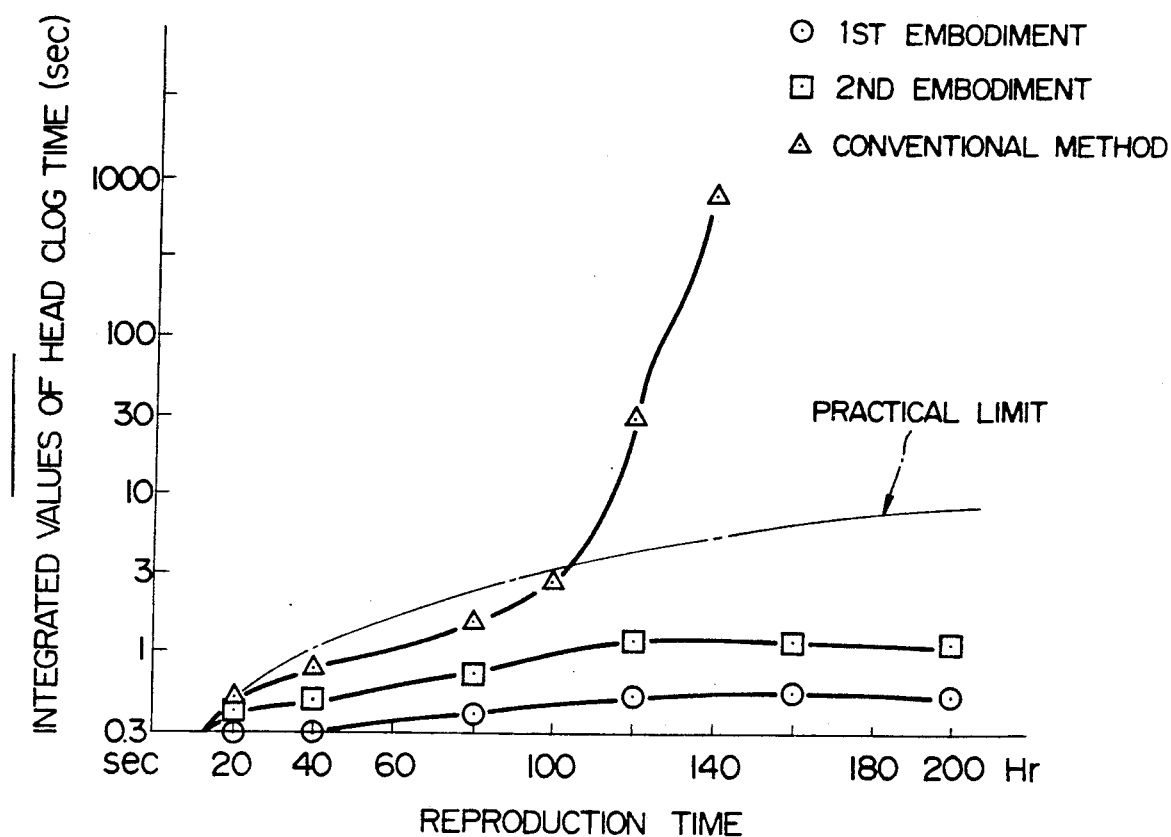
FIG. 4 is a graph showing degrees of clogging in heads as observed with the magnetic recording mediums produced by first and second embodiments of the production method in accordance with the present invention, in comparison with that observed with a magnetic recording medium produced by a conventional method.
Figure 5:
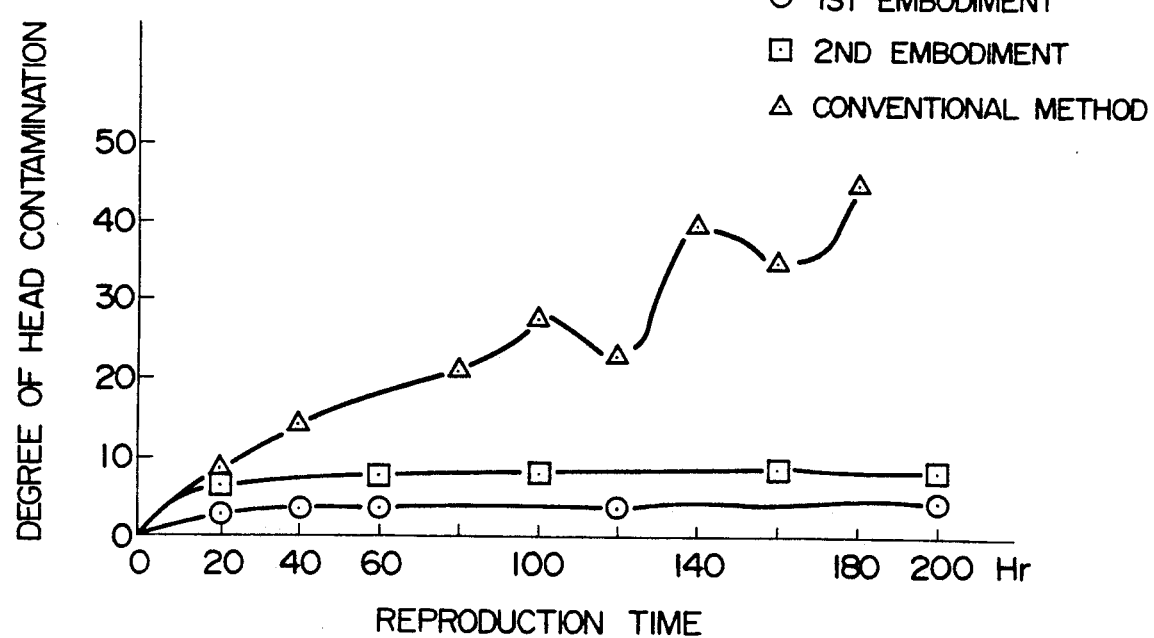
FIG. 5 is a graph showing the degree of contamination of heads as observed with magnetic recording mediums prepared by first and second embodiments of the production method in accordance with the present invention, in comparison with that observed with a magnetic recording medium produced by a conventional method.
Figure 6:
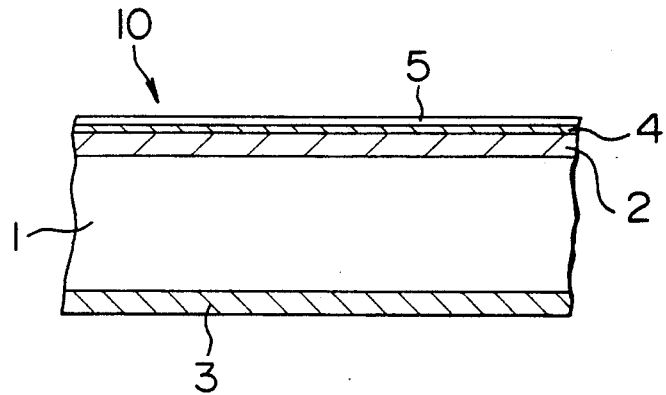
FIG. 6 is a sectional view of the construction of a magnetic recording medium produced by a conventional method.
Figure 7:
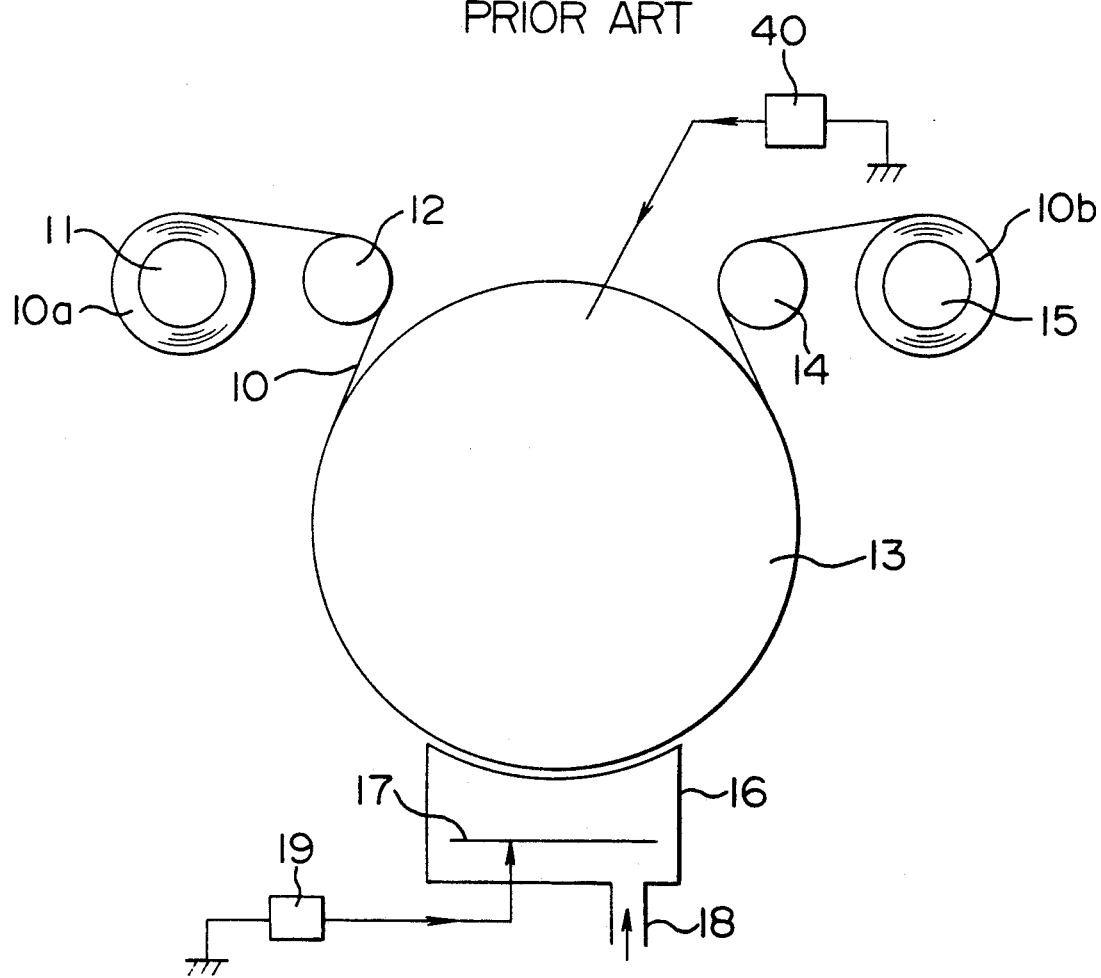
FIG. 7 is an illustration of an apparatus for producing a magnetic recording medium in accordance with a conventional method.

FIGS. 4 and 5 show, respectively, the degrees of clogging in a magnetic head and a degree of contamination of the magnetic head and a degree of contamination of the magnetic head as observed when magnetic recording mediums 10, 20 produced in accordance with the present invention and a magnetic recording medium produced by a conventional method were tested on a video tape recorder. Each of the tested magnetic recording mediums had a diamond-type carbon film of about 100 Å as the protective layer 4, an oxidation film of about 10 Å, and a stearic acid film of 30 Å as the lubrication layer. The test was conducted by using sample magnetic mediums 10, 20 in the form of tapes having a tape width of 8 mm and a recording length of 90 minutes. Each tape was made to run at a speed of 14 mm/sec, while recording was conducted by a rotary cylinder-type video tape recorder with a magnetic head rotated at a relative velocity of 3.8 $\mu$m/sec and a track pitch of about 20 $\mu$m, followed by a 200-hour reproduction. FIG. 4 shows the integrated value of clogging time in relation to the reproduction time, while FIG. 5 shows the degree of contamination of the head. The terms "head clogging time" is used to mean the duration of a period in which the reproduction output level is lowered by 6 dB, while the degree of contamination of the head is a logarithmic representation of amount of deposition of the material of the lubrication layer 4, back coating layer 3 and so forth separated from the magnetic recording medium and attaching to the surface of the head or is vicinity.

From FIG. 4, it will be understood that the recording mediums produced in accordance with the present invention exhibits a remarkable reduction in the head clogging, 1/10 or less that observed with the medium produced by the conventional method, particularly after 100-hour running of the recording medium. It was thus confirmed that the magnetic recording mediums produced by the first and second embodiments clear the requirements of the practical limit of use with sufficiently large values of margin. In contrast, the magnetic recording medium produced by the conventional method showed a large fluctuation in the output level which becomes noticeable substantially simultaneously with the start of occurrence of the head clogging, and the amplitude of the output fluctuation increases as the number of test running increases.

Referring now to FIG. 5, the magnetic recording mediums produced by the first and second embodiments of the production method of the present invention showed a saturation of head contamination after less than 20 test runs and, thereafter, quite a stable value of contamination degree. In contrast, the recording medium produced by the conventional method exhibited an increase in the contamination degree until the tape run 100 times or so and, thereafter, the degree of contamination increased and decreased largely.

Table 1 shows the advantages brought about by the first and second embodiments of the invention in comparison with the conventional method. From this Table, it is clear that the first and second embodiments offer superior effects and that the second embodiment in particular offers an improvement in the still durability.

From the foregoing description, it will be clear that, according to the invention, the strength of bonding between the protective layer 4 and the lubricant can be increased by virtue of the provision of the oxidation layer 4a, so that the multiplied effect produced by the protective layer and the lubricant can be enhanced. In consequence, the scraping off the lubricant of the recording medium due to frictional contact with the head can remarkably be diminished during repeated running of the tape, thus ensuring a stable running of the recording medium while improving the still durability of the same.

In the first and second embodiments as described, the plasma CVD system and the oxidation processing system were disposed at a position corresponding to a single roller. This, however, is only illustrative and the advantages similar to those described in connection with the illustrated embodiments were obtained when no roller was used and also when two rollers were used. The use of a roller or rollers, however, is preferred because defects due to heat, e.g., cracking in the metallic film-type medium, is avoided when the medium is processed while being held in contact with the roller.

As has been described, according to the present invention, an oxidation layer is formed on the protective layer immediately after the formation of the protective layer on the metallic film layer of the magnetic recording medium, so as to enhance the strength of bonding between the protective layer and a lubricant layer which is formed subsequently. It is therefore possible to obtain a magnetic recording medium which is usable, for example, in a video tape recorder with an enhanced practical utility by virtue of a remarkable in anti-head-cologging characteristic and still durability.

TABLE 1

| Advantages of Embodiments Over Conventional Art | | | |
|---|---|---|---|
| | Head clogging | Head contamination after 100-hour running Index shown in ( ) | Still durability Index shown in [ ] |
| 1st embodiment | ◉ [<1 sec/ 100 Hr] | ◉ (<5) | Δ [0.8] |
| 2nd embodiment | ○ [3 sec/ 100 Hr] | ○ (<10) | ◉ [>2] |
| Conventional method | x [Output fluctuation started after 100 Hr running | x (20-30) | ○ [1] |

What is claimed is:

1. A method of producing a magnetic recording medium, comprising the steps of: forming a ferromagnetic metallic film layer on a non-magnetic substrate; forming, by a plasma CVD process, a diamond-type carbon film serving as protective layer on said ferromagnetic metallic film layer; and forming an oxidation layer on said protective layer by a process conducted in a vacuum atmosphere.

2. A method according to claim 1, wherein said process is said vacuum atmosphere employs a plasma discharge processing method making use of a material containing oxygen as a reaction gas.

3. A method according to claim 1, wherein said process in said vacuum atmosphere includes forming said oxidation layer on said protective layer using a material containing oxygen as the reaction gas, with heat produced by a heat source such as a halogen lamp, infrared heater or the like.

* * * * *